United States Patent [19]

Kobayashi et al.

[11] Patent Number: 4,838,313
[45] Date of Patent: Jun. 13, 1989

[54] SOLENOID-OPERATED PRESSURE CONTROL VALVE

[75] Inventors: Kouji Kobayashi, Toyota; Nobuaki Miki, Kariya; Akira Suzuki, Obu, all of Japan

[73] Assignee: Aisin AW Co., Ltd., Anjo, Japan

[21] Appl. No.: 198,405

[22] Filed: May 25, 1988

[30] Foreign Application Priority Data

May 28, 1987 [JP] Japan .................................. 62-133589
May 28, 1987 [JP] Japan .................................. 62-133590

[51] Int. Cl.⁴ ........................................... F15B 13/044
[52] U.S. Cl. .................................... 137/625.65; 91/433
[58] Field of Search ........................ 137/625.65; 91/433

[56] References Cited

U.S. PATENT DOCUMENTS

| | | | |
|---|---|---|---|
| 3,880,476 | 4/1975 | Belart et al. ................ | 137/625.65 X |
| 4,316,599 | 2/1982 | Bouvet et al. ............. | 137/625.65 X |
| 4,535,816 | 8/1985 | Feder et al. . | |
| 4,605,197 | 8/1986 | Casey et al. ................ | 137/625.64 X |

*Primary Examiner*—Gerald A. Michalsky

*Attorney, Agent, or Firm*—Frank J. Jordan; C. Bruce Hamburg; Manabu Kanesaka

[57] ABSTRACT

In a solenoid-operated pressure control valve having a pressure modulating section and a magnetic section, the pressure modulating section includes a valve sleeve having an application port, an output port, a feedback port having throttle passage, and a drain port, and a spool being movable in the valve sleeve; and the magnetic section includes a coil assembly and a rod. According to the above structure a force developed from the magnetic section, a force developed by a spring and an output pressure feedback force are applied and balanced, so that an application pressure is so modulated that the application pressure is taken out as an output pressure corresponding to input electric level to the magnetic section. Furthermore, the spool is made to have at least two lands neighboring on each other and to have different diameters, a feedback port which is directly connected to the area between the different diameters is made on the valve sleeve, and the output pressure is so feedbacked that its volume corresponds to the difference of diameters by applying the pressure from the output port.

5 Claims, 4 Drawing Sheets

SOLENOID-OPERATED PRESSURE CONTROL VALVE

BACKGROUND OF THE INVENTION

1. Field of The Invention

The present invention relates to a pressure control valve which controls fluid pressure in accordance with electrical signals, in particular, to a pressure control valve preferable to control an automatic transmission for a motor vehicle. Typical types of the pressure control valve are a diaphragm type receiving a feedback pressure on the diaphragm, and a spool type receiving the feedback pressure on the spool end. The present invention relates to the spool type pressure control valve, particularly to the structure of spool.

2. Description of The Prior Art

A spool type pressure control valve, in general, has a pressure modulating section including a spool which has two same diameter lands at both ends and is movable, and a magnetic section having a coil assembly, a core and a rod placed coaxially with, and pressed by a spring toward the modulating section. And a spring is attached to a plunger. The difference between a spring force applied to one end of the spool through the rod, and a force by magnetic power is modulated to balance with a feedback force according to an output pressure. And by the move of the spool, the lands of the spool switches an application port and a drain port made on a valve sleeve. Consequently an application pressure from the application port is modulated and taken out from the output port as the output pressure according to the electric level sent to the magnetic section. (refer to U.S. Pat. No. 4,535,816).

Then, in the case of the pressure control valve having the same diameter lands at both ends, to obtain large output pressure by using the magnetic section including the spring the following equation is applied;

$$P = (Fsp - Fsol)/A \quad (1)$$

where
P: output pressure
Fsp: spring force
Fsol: force developed by the magnetic section
A: cross section area of the spool end Due to the above formula, it is understood that to get larger output pressure, only reducing the cross sectional area of the spool is required, but to obtain very large output pressure very small spool is also required. However to attain the above, machining of spool and valve sleeve becomes quite difficult, and furthermore the diameter of the rod shall be also reduced. Consequently the relevant dimensions of the magnetic section have to be revised.

The pressure control valve mentioned above includes the spring to set the range of modulation in the magnetic section, so when assembling, installing the components is not smoothly performed, and coupling of the modulating and magnetic sections is not also performed smoothly.

It is not easy to change the modulation range because the spring has to be exchanged. And in the case that the magnetic section is used with another pressure modulating section utility is quite limited.

In the pressure control valve mentioned above, as shown in the formula (1), the output pressure P is decreased according to an increment of the electric level. If the electrical signal is cut, the maximum output (P=Fsp/A) comes out suddenly, and this sudden high output may damage apparatus equipped in the output side. Considering this upsurge, there is a pressure control valve designed to increase output in accordance with an increment of the electric level. The pressure control valve of this type has merits in view of fail-safe feature, however any changes of properties can not be attained by simple changes of the components.

SUMMARY OF THE INVENTION

An objective of the present invention is to obtain large modulated pressure by such a simple structure as; providing a spool with lands; and applying feedback pressure to an area made between different diameters of lands.

Another objective of the present invention is to materialize an easy assembly of a magnetic section itself, and of the magnetic and a pressure modulating sections by installing the spring in the pressure modulating section; and to make a change of modulation range simple moreover to provide the magnetic section with generality.

The third objective of the present invention is to provide the magnetic section with generality by only changing the direction of feedback pressure without modifying the magnetic section, by which another "current-pressure properties" is obtained.

Accordingly, the present invention is explained as follows: in a solenoid-operated pressure control valve (1), a valve sleeve (5) has an application port (15), an output port (13), a feedback port (16) having a throttle passage, and a drain port (12); a spool (6) is movable in the valve sleeve (5); and a force developed from the magnetic section (3), a force developed by a spring (7) and an output pressure feedback force are applied to the spool (6) and balanced; by doing so an application pressure is modulated and taken out as an output pressure which corresponds to electric level sent to the magnetic section 3. The spool (6) has same diameter lands (17), (19), and a land (20) of different diameter is placed next to either the land (17) or (19); between one of the lands, for example (19), and the land (20) the feedback port (16) is laid, so output pressure is feedbacked according to the difference of cross section of the land (19) and (20).

Based on the above structure, a pressure applied from a pump, etc. is sent to an opening made by the land (19) and the application port (15) and taken out form the output port (13) which is connected to each apparatus. At this time a part of the output pressure from the output port (13) is branched to a space (22) made by the land (19), (20) and the valve sleeve (5) through the feedback port (16). Then the force developed by area difference of the lands (19) and (20), the force developed by the magnetic section (3) and the force developed by the spring (7) are balanced. Because of this force balance the spool (6) moves in the valve sleeve (5), and the opening ratios of the application port (15) and the drain port (12) are set. The opening ratios mean that the output pressure has certain value corresponding to the electric level sent to the magnetic section (3).

DETAILED DESCRIPTION OF THE PREFERRED EMBODIMENTS

The embodiments of the present invention is explained along the drawings.

Figure 1:
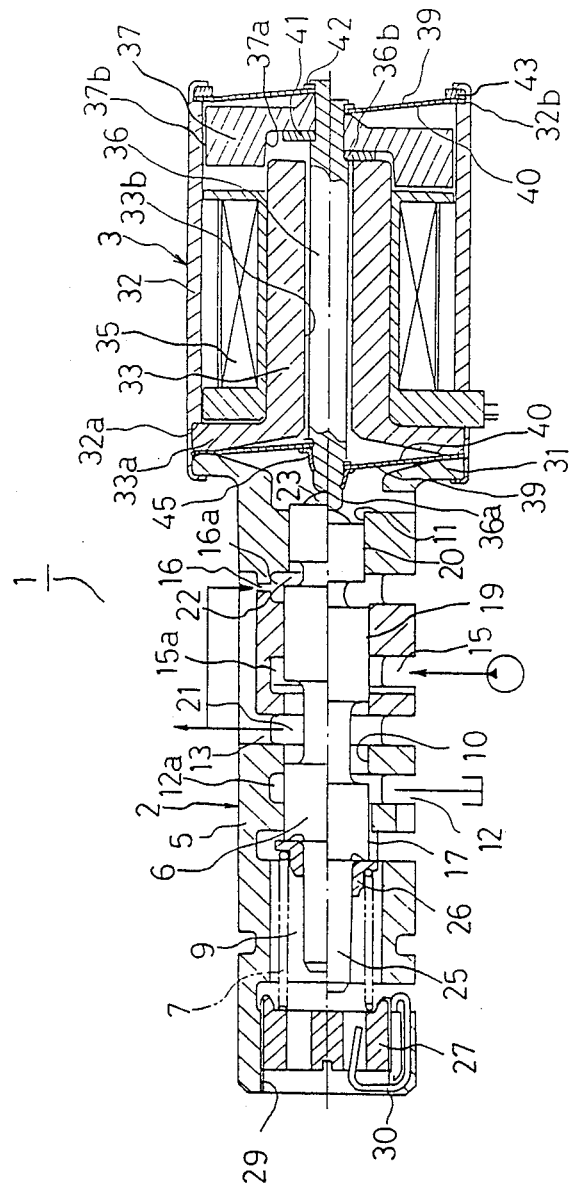
FIG. 1 is a cross sectional view of a solenoid-operated pressure control valve, showing the first embodiment, related to the present invention.

A solenoid-operated pressure control valve 1, shown in FIG. 1, has a pressure modulating section 2 and a magnetic section 3.

The pressure modulating section has a valve sleeve 5 and a spool 6. The valve sleeve 5 has a large hole 9, a middle hole 10 and a small hole 11. The large hole 9 contains a spring 7 in axial direction and the middle hole 10 contains the spool 6.

On the circumference of the valve sleeve 5 along the middle hole 10, a drain port 12, an output port 13 and an application port 15 are laid in this sequence. On the border of the holes 10 and 11 of the valve sleeve 5, a feedback port having a throttle passage is provided. And to make fluid flow smooth at each port ringed dents 12a, 15a and 16a are provided.

The spool 6 has the lands 17 and 19 having same diameters, and the land 20 which has small diameter and is close to the land 19. The lands 17 and 19 are movable in the middle hole 10 and the land 20 is movable in the small hole 11. The distance between the lands 17 and 19 is so set that the output port 13 is connected to both the application port 15 and drain port 12 according to certain ratio of openings by the spool 6.

A space 21 between the lands 17 and 19 is always connected to the output port 13 without changing opening ratio.

On the other hand, a space 22 surrounded by the lands 19, 20 and the holes 10 and 11 is always connected to the feedback port 16.

In FIG. 1, a half-ball type extrusion 23 at the center of the land 20 is a contact point to the rod 36. A bar member 25 extended from the center of the land 17 is a guide member for the spring 7 and a stroke limiter for the spool 6.

The assembly of pressure modulating section 2 is that; from one end of the hole 9 the spool 6 attaching a washer 26 on the bar member 25 is inserted; this time the spool 6 is inserted from the left to the right in FIG. 1; a male thread member 27 screws a female thread member 29 of the valve sleeve 5 so that compression is provided to the spring 7 at the same time the spring 7 is held by the washer 26; the male thread member 27 is fixed to the valve sleeve 5 by a pin 30. After the assembly of the pressure modulating section 2, this section 2 is coupled with the magnetic section 3 by caulking a brim of a case 32 to a flange 31.

The magnetic section 3 has a static section and a movable section. The static section has a cylindrical case 32 made of magnetic material, a thick cylindrical core 33 and a coil assembly 35. A flange 33a of the core 33 engages one end of the case 32, the core 33 is concentrically laid with the case 32, and the coil assembly 35 is supported in a space made by the case 32 and the core 33. The movable section has the rod 36, a plunger 37, disc type supporting members 39, 39 and a disc type sheet members 40, 40.

The rod 36 is inserted in a hollow area 33b, the plunger 37 made of magnetic material is laid at another end of the rod 36 and the plunger 37 is magnetically attracted by the coil assembly 35. The disc type supporting members 39, 39 made of thin leaf spring supports the rod 36 at both ends, and the disc type sheet members 40, 40 are overlaid on the supporting members 39, 39.

The plunger 37 is fixed on an end of the rod 36, and has thick cylindrical shape, and the center area toward the core 33 has a concave 37a so that the core 33 is fitted in with minute space when the plunger 37 is magnetically attracted. And circumference 37b faces an inner surface of the case 32 with a minute space.

Figure 2:
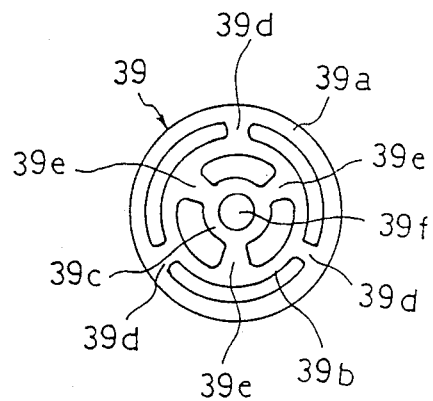
FIG. 2 is a front view of a disc type supporting member.

The disc type supporting members 39, 39, as shown in FIG. 2, have an outer ring 39a, middle ring 39b and an inner ring 39c. Furthermore, among them radial connecting parts 39d, 39d, 39d connect the outer ring 39a and the middle ring 39b; and radial connecting parts 39e, 39e, 39e connect the middle ring 39b and the inner ring 39c.

At the center of the inner ring 39c, a hole 39f to pass the rod 36 is made. The supporting members 39, 39 have quite weak spring properties, so it facilitates axial move of the rod 36 and gives little resistance against the move of the rod 36.

Figure 3:
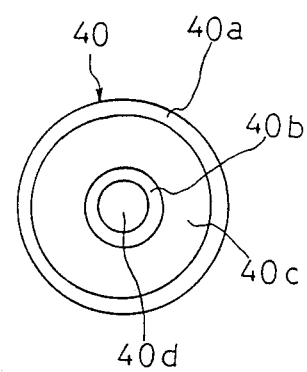
FIG. 3 is a front view of a disc type sheet member.

Each disc type sheet member 40, as shown in FIG. 3, has reinforcement limbs 40a, 40b, and the area 40c (between 40a and 40b) is a perforated thin membrane having liquid proof and air permiability. The center of the sheet member 40 has a hole 40d to pass the rod 36, and as a whole, the sheet member 40 has a quite flexible property.

The assembly of the magnetic section is that; the core 33 with the coil assembly 35 fixed is inserted from one side of the case 32; the flange 33a is located and fixed by a step 32a, then the static section is completed; on the other hand, at an end section 36b on the rod 36, the plunger 37 encloses the section 36b with a stopper 41 so that the stopper 41 prevents the core 33 from contacting the end of the concave 37a of the plunger 37; outside of the plunger 37, the disc type sheet member 40 and supporting member 39, and a washer 42 enclose the section 36b and caulked, and then the movable section is completed; the movable section is inserted from one end of the case 32; the limb 40a and the outer ring 39a are positioned and fixed in a dent 32b made at an end of the case 32; a circular holder 43 is set next to the supporting member 39 toward axially outside; the brim of another side of the case 32 is caulked; another end of the rod 36 is supported by the supporting member 39 and the sheet member 40; at a small section 36a at one end of the rod 36, the sheet 40 and the supporting member 39 enclose the rod 36; from outside an elastic holder 45 also encloses the rod 36, and is fixed to the rod 36; then a side of the movable section is fixed on the static section.

The flange 31 made at a side of the valve sleeve 5 is inserted in one side of the case 32; the limb 40a of the sheet member 40 and the outer ring 39a of the supporting member 39 are held between the flange 31 and the flange 33a of the core 33; and the brim of the case 32 is caulked to the circumference of the flange 31. By doing this the assembly work is completed.

In the case that the sheet member 40 and the supporting member 39 are caulked to the case 32 at an end of the magnetic section 3 (right side of FIG. 1), if the case 32 is caulked after inserting a ringed stopper (not shown) at the dent 32b to regulate the move of plunger 37 to another side, setting of initial position of the plunger 37 can be easily and correctly attained when the plunger 37 is under the motion. Accordingly the motion of the magnetic section 3 and precision of modulating property to input current of the solenoid-operated pressure control valve 1 are largely enhanced.

The embodiment has the above stated elements, and when pressure liquid (for example: oil) is applied to the application port 15 from a pump, etc., the oil is led to the space between the lands 19 and 17 through the opening of the valve sleeve 5 and the land 19. Further the oil is applied to each apparatus in a hydraulic system in an automatic transmission, etc. from the output port 13 laid between the lands 17 and 19. The pressure P taken from the output port 13, at the same time, is led to the feedback port 16 through the feedback passage, and led to the space 22 between the lands 19 and 20. Based on difference of the cross section A1 of the land 19, and the cross section A2 of the land 20: (A1−A2), a feedback force P(A1−A2) is developed. Then the force is added to the force Fsol developed from the magnetic section 3: P(A1−A2)+Fsol, this force presses the spool 6 to the left direction. The spool 6 is moved to the point where the above force, i.e. sum of the magnetic section and the feedback pressure, is balanced the force developed by the spring 7 i.e. Fsp, the force presses the spool 6 to the right direction. By the move of the spool 6, the lands 17 and 19 provide the application port 15 and the drain port 12 with certain opening ratios to the output port 13. As a result, the output pressure P at the output port 13 corresponds to the electrical signals sent to the magnetic section 3:

$$P = (Fsp - Fsol)/(A1 - A2) \quad (2)$$

Figure 4:
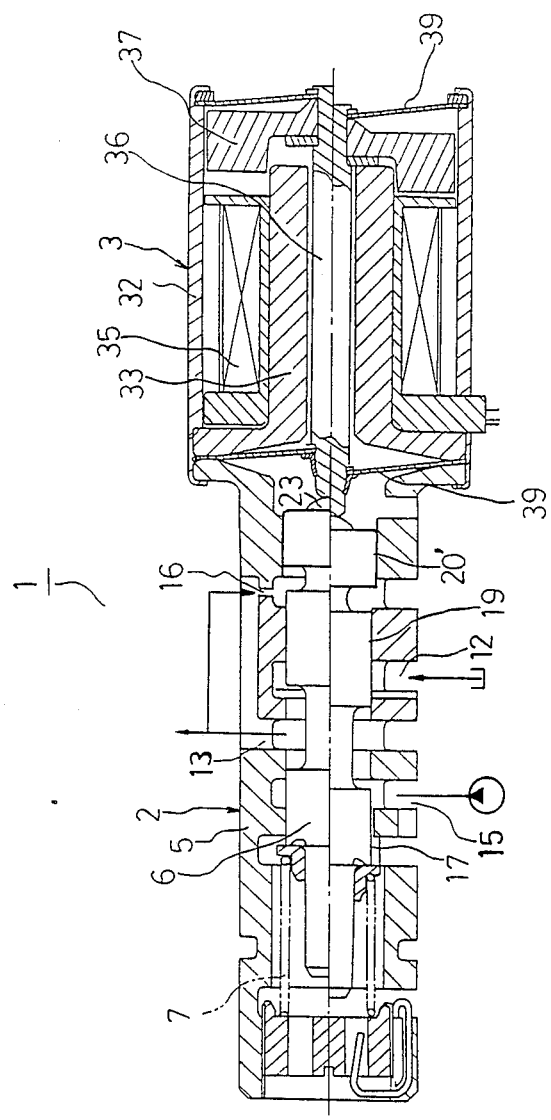
FIG. 4 is a cross sectional view of a solenoid-operated pressure control valve for another embodiment.

On the other hand, as shown in FIG. 4, the cross section A2 of the land 20' is made larger than the cross section A1 of the land 19, and the spring 7 is given a property weak enough only to contact the spool 6 and the rod 36. And the positions of the application port 15 and the drain port 12 are changed each other, the following formula is obtained:

$$P = (Fsol - Fsp)/(A2 - A1) \quad (3)$$

Due to the above modification, the output pressure P is increased according to the increment of the electrical signals input to the magnetic section 3. And to obtain the same property of the solenoid-operated pressure control valve, it is suggested that the land 20 (in FIG. 1) is relocated to the left side of the land 17, and each port is made accordingly on the valve sleeve 5.

Figure 5:
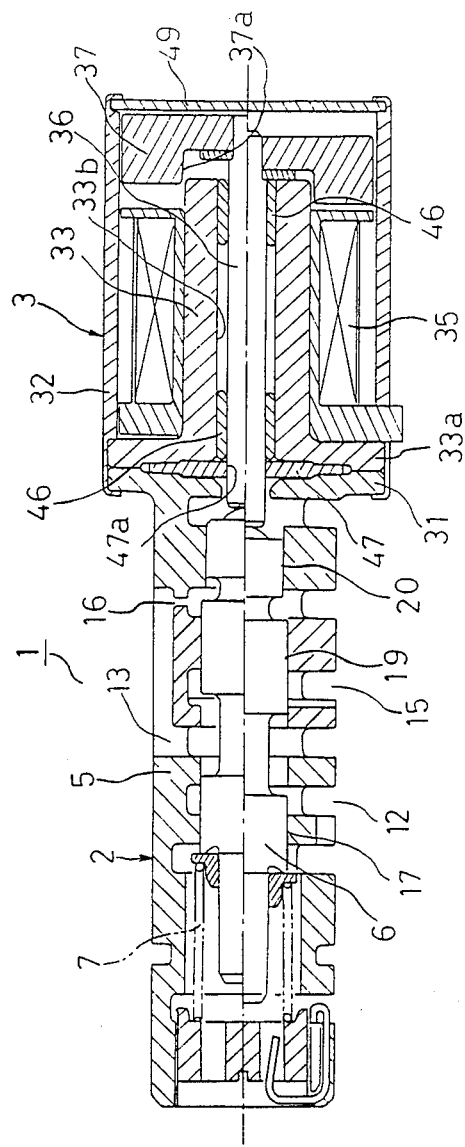
FIG. 5 is a cross sectional view of a solenoid-operated pressure control valve for the third embodiment.

The third embodiment is explained along FIG. 5. This embodiment is a partial modification of the first embodiment.

Instead of the disc type supporting members 39, 39, the rod 36 is supported by bushes 46, 46 in the hollow area 33b. And instead of the disc type sheet member 40 (sealing structure) a flexible and perforated disc type supporting member 47 is set between the flange 31 of the valve sleeve 5 and the flange 33a of the core 33. The supporting member 47 is made of flexible and perforated material, such as felt, to absorb minute foreign materials, and the member 47 has a center hole 47a to pass the rod 36 with a little margin. Another side of the case 32 is sealed by a disc type member 49. Due to this the concentricity of the core 33 and the concave 37a of the plunger 37 is enhanced. Accordingly in operation, magnetic attraction less varies and stable performance is obtained. The supporting member 47 prevents foreign materials from entering into the magnetic section 3 from the pressure modulating section 2, and the member 47 provides the rod 36 with less sliding resistance. Furthermore smooth assembly can be obtained.

Effects of the present invention are shown as follows:

At least two lands 19, 20 having different diameters are located close to each other, and between them (19, 20) the feedback port 16 is laid to feedback the output pressure according to the difference of the diameters of the lands. Because of the above, the magnetic section 3 requires no modifications, and the pressure modulating section can adjust modulation range by only modifying a part of the valve sleeve 5 and the spool 6. This means that a pressure control valve having various pressure modulating properties can easily obtained without cost increase, so generality of the pressure control valve is enhanced. Consequently wide variety of usage is secured for various hydro-pneumatic apparatus.

As the feedback port 16 has a throttle passage, stable feedback pressure an be applied to the lands 19, 20, so stable pressure modulation is performed.

The spring 7 is laid at the opposite side of the magnetic section 3. As the magnetic section has no spring, assembly of the magnetic section is performed only fixing each component though the magnetic section 3 is more complicated than the pressure modulating section 2.

Due to the above, assembly of the pressure control valve 1 is completed only by coupling the pressure modulating section 2 and the magnetic section 3 so that the end of the spool 6 and the end of the rod 36 contact. In the case that the modulation range is changed by springs, various diameters of the spring 7 can be applied to the pressure modulating section 2 by setting a spring hole of the valve sleeve 5 larger.

This can cope with wide range of pressure modulation change. Further this means that the magnetic section 3 can be utilized in common for pressure modulating sections having different diameters of the spring 7 and the spool 6.

In the case that feedback force is applied in the same direction as that of developed from the magnetic section 3, the land 20 can be made on the magnetic section side, so that the spool 6 is assembled or disassembled from the opposite side of the magnetic section 3, and accordingly assembly and maintenance become easy and simple.

In the case that feedback force is applied in the opposite direction of the force from the magnetic section 3, even if electrical signals are cut, the output pressure becomes zero, or this means that fail-safe system works.

We claim:

1. A solenoid-operated pressure control valve, comprising:

a magnetic section having a coil assembly and a rod slidably situated inside the coil assembly, said rod being moved by means of the coil assembly, and a pressure modulating valve section connected to the magnetic section and including, a valve sleeve connected to the magnetic section at one end thereof and having a side portion, an application port, an output port, a drain port, and a feedback port communicating the output port, said application, output and drain ports being formed on the side portion, a spring attached to an end of the valve sleeve at a side opposite the magnetic section, and a spool slidably situated inside the valve sleeve between the spring and the rod of the magnetic section so that the movement of the spool is controlled by the spring and the magnetic section, said spool comprising a first land for controlling a flow ratio between the output port and the drain port, a second land for controlling a flow ratio between the application port and the output port, a third land situated adjacent to one of the first and second lands and having a diameter different from that of the land adjacent thereto, and a feedback area formed between the third land and one of the first and second lands situated adjacent the third land, forces exerted from the magnetic section, spring and feedback area due to a difference of diameters between the third land and the adjacent land being applied to the spool to balance in the valve sleeve so that pressure in the application port is modulated to pressure which corresponds to an input electric level of the magnetic section and is supplied to the output port.

2. A solenoid-operated pressure control valve according to claim 1, wherein said valve sleeve further includes a throttle passage for connecting the feedback port and the output port.

3. A solenoid-operated pressure control valve according to claim 1, wherein said spool have first and second ends, said first end contacting the rod of the magnetic section and said second end contacting the spring so that the rod and spring operate to push the spool outwardly.

4. A solenoid-operated pressure control valve according to claim 1, wherein said third land is set so that the feedback force works in the same direction as the force developed by the magnetic section.

5. A solenoid-operated pressure control valve according to claim 1, wherein said third land is set so that the feedback force works in the direction opposite to the force developed by the magnetic section.

* * * * *